United States Patent
Al Ghatta et al.

(10) Patent No.: US 6,444,717 B1
(45) Date of Patent: *Sep. 3, 2002

(54) FOAMED POLYESTER RESINS WITH FLAME RETARDANT PROPERTIES

(75) Inventors: Hussain Al Ghatta, Fiuggi; Arianna Giovannini, Bologna; Tonino Severini, Colleferro, all of (IT)

(73) Assignee: Sinco Ricerche S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 09/159,373

(22) Filed: Sep. 22, 1998

(30) Foreign Application Priority Data

Oct. 6, 1997 (IT) .......................................... MI97A2264

(51) Int. Cl.$^7$ .............................. C08J 9/08; C08J 9/10; C08J 9/14
(52) U.S. Cl. ............................... 521/94; 521/97; 521/98
(58) Field of Search .............................. 521/98, 182, 94, 521/97, 128, 130; 528/308.6; 524/373, 371, 94

(56) References Cited

U.S. PATENT DOCUMENTS

| | | | | | |
|---|---|---|---|---|---|
| 3,957,598 A | * | 5/1976 | Merkl | .......................... | 204/72 |
| 4,010,219 A | * | 3/1977 | Aoyama et al. | ............. | 524/411 |
| 4,278,769 A | * | 7/1981 | Gebauer et al. | ............... | 521/91 |
| 4,280,005 A | * | 7/1981 | Fox | .............................. | 521/182 |
| 4,374,220 A | * | 2/1983 | Sonnenberg | ................. | 524/94 |
| 4,399,244 A | * | 8/1983 | Bier | .............................. | 524/89 |
| 4,530,880 A | * | 7/1985 | Taniuchi et al. | ............. | 524/142 |
| 4,546,126 A | * | 10/1985 | Breitenfellner et al. | ........ | 524/94 |
| 5,362,763 A | * | 11/1994 | Al Ghatta et al. | ........... | 521/182 |
| 5,391,582 A | * | 2/1995 | Muschiatti | .................... | 521/182 |
| 5,508,316 A | * | 4/1996 | Nakamura et al. | ........... | 521/182 |
| 5,519,066 A | * | 5/1996 | McConnell et al. | ......... | 521/182 |
| 5,536,793 A | * | 7/1996 | Rotter et al. | ................. | 525/437 |
| 5,696,176 A | * | 12/1997 | Khemani et al. | .............. | 521/81 |
| 5,717,018 A | * | 2/1998 | Magerstedt et al. | ......... | 524/413 |
| 5,801,206 A | * | 9/1998 | Khemani et al. | .............. | 521/81 |

FOREIGN PATENT DOCUMENTS

| | | |
|---|---|---|
| JP | 4-142363 | 5/1992 |
| WO | 93-12164 | 6/1993 |
| WO | 96/40821 | 12/1996 |

OTHER PUBLICATIONS

MPEP—Section 714.22 (2000 edition).*
Hirai, T., "Fire Resistanat Thermoplastic Polyester Resin Compositions," Sekisui Plastics Co., Ltd., Chemical Abstracts, vol. 118, No. 10, Mar. 8, 1993.
European Search Report re application No. EP 98121944.7–2102 to Sinco Ricerche, S.p.A., Jan. 28, 1999.

* cited by examiner

*Primary Examiner*—Peter Szekely
(74) *Attorney, Agent, or Firm*—Cook, Alex, McFarron, Manzo, Cummings & Mehler, Ltd.

(57) ABSTRACT

Flame retardant compositions comprising a polyester resin having a melt strength higher than 8 centinewton an intrinsic viscosity greater than 0.8 dl/g, suitable for the preparation of foamed cellular material and a flame retardant compound capable of not reducing below 3 Nm the torque intake of the resin in a heating test at 280° C. under nitrogen for 10 minutes in the presence of 10% by weight of the flame retardant compound.

7 Claims, No Drawings

FOAMED POLYESTER RESINS WITH FLAME RETARDANT PROPERTIES

BACKGROUND OF THE INVENTION

The present invention is directed to flame retardant compositions comprising an aromatic polyester resin having rheological characteristics suitable for the preparation of foamable cellular materials and the foamed materials therefrom.

Foamed cellular materials (foams) from aromatic polyester resins, representatively polyethylene terephthalate (PET), are having increasingly greater application in the automotive and domestic field either for thermal insulation or as structural material.

For these applications, it is necessary that the foamed material be endowed with good flame retardant properties.

The addition of flame retardant compounds to aromatic polyester resins having rheological properties suitable for the formation of foams endowed with valuable properties has the effect of considerably lowering the rheological properties of the resins and to rendering the same not suitable for the preparation of the foams. Some compounds also cause such remarkable degradations to the resins as to prevent their use as plastic material.

The deterioration of the rheological properties is due to the high temperatures used in the process for the preparation of the foams.

It is strange that the deterioration manifests itself only in resins having high properties of melt strength and viscosity in the melt and not in resins having relatively low melt strength values, and which are not suitable for the preparation of foams with satisfactory properties.

SUMMARY OF INVENTION AND DETAILED DESCRIPTION OF THE PRESENTLY PREFERRED EMBODIMENTS

It has been found that flame retardant compounds usable in the compositions of the present invention are those that do not cause a decrease of the rheological properties of the resins corresponding to a decrease of the torque intake lower than 3 Nm in a heating test of the resin added with 10% by weight of the flame retardant compound, operating at 280° C. in a rheomix under nitrogen for 10'.

Flame retardant compounds that satisfy the above mentioned test include aromatic brominated compounds containing more than 50% by weight of bromine and having a weight loss at heating at 200° C. less than 5% (determined thermogravimetrically with heating speed of 10° C./min.).

Representative compounds are N,N'-ethylene-bis (tetrabromophthalimide), tetrabromophthtalic anhydride, decabromodiphenylether, octabromodiphenylether, bis (tribromophenoxy)ethane, bis(bromophenoxy)ethane.

Of these, the N,N'-ethylene-bis(tetrabromophthalimide) is the preferred compound thanks to its high melting point, the good stability and the reduced degrading effect on the polyester resin. The compound is commercialized under the trademark Saytex BT 93 of Albermarle. Another bromide compound particularly suitable is commercialized under the trademark Saytex 8010 of Albermarle.

The quantity of the flame retardant compound used is from 1 to 15% by weight.

In the case of tetrabromophthalimide when using 10% by weight of compound, foams classified as B1 are obtained according to the flammability test DIN 4102 and as M2 according to test UNE 23727-90. With 5% by weight of Saytex 8010, foams classified as M1 are obtained according to test UNE 23727-90.

Another usable compound, not comprised in the class of brominated compounds, is basic aluminum oxalate sold by Alcoa under the name BAO.

The foams of the present invention, containing flame retardant agents, have properties comparable with those of the foams without such additives.

The brominated compounds can be used in mixtures with antimony compounds such as sodium antimoniate, antimony trioxide and antimony pentoxide in quantities of 0.5–5% by weight. In the case of sodium antimoniate, the quantity is 0.5–10% by weight; in the oxides case, it is 1–10% by weight.

In the case of sodium antimoniate, it is also possible to use silica in quantity of 0.05–2% by weight of the resin.

The flame retardant compounds can be added before or during the extrusion-foaming step.

They can be added as such or in form of a masterbatch based on polycarbonates, polybutylene terephthalate or polyethylene.

As already indicated, the addition of the above brominated compounds to polyester resins not having the necessary rheological properties, for example a branched PET obtained with trimellitic anhydride, (I.V.=0.95 dl/g) having insufficiently high melt strength or a linear PET of high I.V. (1.1 dl/g) obtained by polycondensation in the solid state without the use of pyromellitic dianhydride and having melt strength less than 8 centiNewton, doesn't sensibly lower the rheological properties of the polymer.

The torque intake of PET added with 10% by weight of a flame retardant compound such as Saytex BT 93 remains unchanged (test at 280° C. in a rheomix for 10 minutes, under nitrogen).

The preparation of the foamed cellular material from the compositions of the present invention is made according to known methods by extrusion-foaming in the presence of a foaming agent. The polyester resins usable for the preparation of the foams of the present invention are characterized by melt strength values greater than 8 centiNewton and by an intrinsic viscosity higher than 0.8 dl/g.

The above mentioned values refer to the resin prior to the extrusion-foaming process as well as to the resin that, under the extrusion conditions, reaches such values during the extrusion step.

A method for obtaining the polyester resins having rheological properties suitable for the formation of the foams of the present invention comprises extruding the resin with I.V. 0.5 –0.7 dl/g added with a dianhydride of a tetracarboxylic acid, preferable an aromatic acid, (preferably pyromellitic dianhydride) in quantities from 0.1 to 1% by weight and subjecting the resin to polyaddition in the solid state until it reaches final viscosity values of 0.85–1.95 dl/g.

The dianhydride of the tetracarboxylic acid can be added to the resin in the form of a masterbatch with polycarbonate, polybutylene terephthalate or with polyethylene in quantities from 1 to 50% in weight.

Another method comprises extruding the polyester resin having intrinsic viscosity from 0.85 to 1.95 dl/g added with a masterbatch of the dianhydride containing polycarbonate, polybutylene terephthalate or polyethylene containing 1–50% by weight of dianhydride.

The masterbatch is added in quantities corresponding to a concentration of dianhydride in the polyester resin from 0.1 to 1% by weight. The dianhydride in the masterbatch is preferably pyromellitic dianhydride.

The aromatic polyester resins usable in the compositions of the present invention are obtained by polycondensation of an aromatic dicarboxylic acid (representatively terephthalic acid or its lower alkyl esters), with an aliphatic diol with 2–10 carbon atoms (representatively ethylene glycol, 1,4-butylene glycol, 1,4-cycloherandimethyol).

The preferred resin is polyethylene terephthalate or copolyethylene terephthalate in which up to 20% of units from terephthalic acid are substituted with units deriving from isophthalic acid or naphtalene dicarboxylic acids.

The intrinsic viscosity is measured in solutions of 0.5 g polyester in 100 ml of a 60/40 mixture by weight of phenol-tetrachloroethane at 25° C. operating according to ASTM D 4603-86.

The melt strength is measured by extruding a polymer filament in the capillary of a Goettfert rheometer provided with a capillary having a geometry of 30 mm in length and 1 mm in diameter and with an entrance angle of 90°.

The piston velocity is 0.2 mm/s. The filament is taken between steel cog-wheels to which a linear acceleration of the peripheral velocity is applied. The acceleration is of 60 mm/s$^2$, and the reported tension is the strength that the filament applies to the wheels at the maximum velocity (1000 mm/s).

The measurement is made at 270° C. according to ASTM D 4440.

The measurements of compression set and of the compression module are made according to ASTM D 1621 and D 1623.

The following examples are provided to illustrate and not to limit the present invention.

EXAMPLE 1

A mixture of 2.25 g of Saytex 8010 and of 42.75 g upgraded PET, acronym PET-F (I.V.=1.2 dl/g, melt strength of 20–25 centiNewton, obtained by polyaddition in the solid state at 207° C. for 13 hours of PET with I.V. 0.63 dl/g added with 0,4% by weight of PMDA; the PET-F was previously dried at 120° C. under vacuum for 16 hours) is loaded in the chamber of a Rheomix-Haake.

The chamber is heated at 280° C. and held under nitrogen. The rotation of the rheomix is of 20 rpm.

After 5 minutes, the torque intake of the melted mixture was about 6 Nm; after 10 minutes, about 4 Nm and after 20 minutes, about 2 Nm.

A foamed material obtained from the thus added PET-F (extrusion—foaming at 240–280° C., using 1–5% by weight of CO2, N$_2$ or a chlorofluoroalkane as foaming agent) is classifiable as M1 operating according to the standard test UNE 23727-90.

The compression module of the foamed material was 6.87 MPa; the compression set of 0.438 MPa.

Comparison Example 1

Example 1 is repeated with the only difference that only PET-F is used.

After 5 minutes of heating, the torque intake was 8 Nm; and after 10 minutes, and about 4 Nm; and after 20 minutes, about 2 Nm.

EXAMPLE 2

A mixture of 40.5 g of PET-F used in Example 1 and 4.5 g of Saytex BT 93 is loaded in the Rheomix-Haake and subjected to test under the conditions of Example 1.

After 5 minutes, the torque intake was about 7 Nm; after 10 minutes, about 4 Nm; and after 20 minutes, about 3 Nm.

A foamed material obtained under the conditions of Example 1 was classifiable as B1 according to the flammability test D1N 4102.

EXAMPLE 3

A mixture of 43.2 g of PET-F from Example 1 and of 1.3 g of Saytex BT93 (3% by weight), 0.225 g of sodium antimoniate (0.3% weight) and 0.225 g of polycarbonate masterbatch containing 10% by weight of PMDA (equivalent to 0.3% of PMDA in the mixture) is dried at 120° C. for 16 hours under vacuum.

The mixture is loaded into the Rheomix-Haake chamber and heated under the conditions of Example 1.

After 5 minutes, the torque intake was about 9 Nm; after 10 minutes, about 5 Nm; and after 20 minutes, about 2 Nm.

The thus added polyester was extruded to obtain a foam. The foam had mechanical characteristics comparable to those of Example 1.

The material was classifiable as B1 according do DIN 4102.

Comparison Example 2

A mixture of PET-F with 20% by weight of ammonium polyphosphate (FR CROSS 484 commercialized by Bundenheim Iberica) and 8% of melamine cyanurate (PLASTISAN B commercialized by Bundenheim Iberica) and 0.3% of Aerosil OX50 by Degussa is loaded in the Rheomix-Haake chamber and subjected to heating under the conditions of Example 1.

After 2 minutes, the torque intake was of about 2 Nm; and after 5 minutes, the absorption was practically reduced to zero.

Such results are obtained using as a flame retardant only FR CROSS 484 with or without silica. The thus added PET was not usable to form foamed material.

Comparison Example 3

A mixture of PET-F from Example 1 and of 3.5% by weight of Amgord P45 (a phospho-organic compound commercialized by Albright & Wilson) is used in the heating test described in Example 1.

After 5 minutes, the torque intake was about 3 Nm; and after 10 minutes, about 1 Nm.

The material was not foamable.

Comparison Example 4

PET with I.V.=1.19 dl/g (previously dried at 120° C. for 16 h) obtained by polycondensation in the solid state of PET with I.V.=0.63 dl/g (the PET was not added with PMDA) is mixed with 5% by weight of Saytex 8010. The mixture is subjected to heating under the conditions of Example 1.

After 5 minutes, the torque intake was of about 3 Nm., and after 10 minutes, about 2 Nm.

The material was not foamable.

What is claimed is:
1. Compositions of foamed cellular materials comprising:
  an aromatic polyester resin selected from the group consisting of polyethylene terephthalate and copolyethylene terephthalate copolymers in which not more the 20% of the therephtalic acid units are substituted with units deriving from isophthalic acid and naphthalene dicarboxylic acids having a melt strength higher than 8 centiNewton and intrinsic viscosity higher than 0.8 dl/g; and a flame retardant compound in quantity of from 1 to 15% by weight of the composition, said flame retardant compound being capable of not reducing the torque intake of the resin to values less than 3 Nm when the resin, added with 10% by weight of the compound, is heated at 280° C. for 10 minutes under nitrogen in a rheomix and said flame retardant being a bromo compound selected from the group consisting of N,N'-ethylene-bis(tetrabromophthalimide), tetrabromophthalic anhydride, decabromodiphenylether, octabromodiphenylether, bis(tribromophenoxy)ethane and bis(pentabromophenoxy)ethane.

2. Compositions according to claim 1, wherein the polyester resin is obtained by polyaddition in the solid state of a resin with an intrinsic viscosity from 0.5 to 0.7 dl/g added with 0.1–1% by weight of a dianhydride of an aromatic tetracarboxylic acid.

3. Compositions according to claim 2, wherein the dianhydride is pyromellitic dianhydride.

4. Compositions according to claim 1, wherein the polyester resin is obtained by extruding a resin having an intrinsic viscosity from 0.8 to 1.95 dl/g in the presence of a masterbatch of a polymer selected from the group consisting of polycarbonate, polyethylene and polyethylene terephthalate containing from 1 to 50% in weight of a dianhydride of an aromatic tetracarboxylic acid, the masterbatch being added in quantities such as to introduce form 0.1to 1% by weight of dianhydride.

5. Compositions according to claim 4, wherein the masterbatch contains pyromellitic dianhydride.

6. Compositions according to claim 1, wherein the flame retardant compound is added to the resin before or during the transformation process of the resin into cellular foamed material.

7. Compositions according to claim 5, wherein the flame retardant compound is added to the resin before or during the transformation process of the resin into cellular foamed material.

* * * * *